(12) United States Patent
Lin et al.

(10) Patent No.: US 10,325,406 B2
(45) Date of Patent: Jun. 18, 2019

(54) IMAGE SYNTHESIS METHOD AND IMAGE SYNTHESIS DEVICE FOR VIRTUAL OBJECT

(71) Applicant: INDUSTRIAL TECHNOLOGY RESEARCH INSTITUTE, Hsinchu (TW)

(72) Inventors: Shang-Yi Lin, Taichung (TW); Chia-Chen Chen, Hsinchu (TW); Chen-Hao Wei, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/395,357

(22) Filed: Dec. 30, 2016

(65) Prior Publication Data

US 2018/0137682 A1 May 17, 2018

(30) Foreign Application Priority Data

Nov. 11, 2016 (TW) .............................. 105136870 A (51) Int. Cl.
*G09G 5/00* (2006.01)
*G06T 19/00* (2011.01)
(Continued)

(52) U.S. Cl.
CPC .......... *G06T 19/006* (2013.01); *G06K 9/4642* (2013.01); *G06K 9/4652* (2013.01);
(Continued)

(58) Field of Classification Search
CPC ....... G06T 19/006; G06T 19/00; G06F 3/011; G06F 3/012; G03B 27/017
(Continued)

(56) References Cited

U.S. PATENT DOCUMENTS 7,696,995 B2 * 4/2010 McTaggart ............ G06T 15/506
345/426
7,889,948 B2 2/2011 Steedly et al.
(Continued)

FOREIGN PATENT DOCUMENTS

CN 103777757 A 5/2014
CN 104851134 A 8/2015
(Continued)

OTHER PUBLICATIONS

Pentland, A. P. Finding the illuminant direction J. Opt. Soc. Am., vol. 72, No. 4 (Apr. 1982), pp. 448-455.*
(Continued)

*Primary Examiner* — Gordon G Liu
(74) *Attorney, Agent, or Firm* — Muncy, Geissler, Olds & Lowe, P.C.

(57) ABSTRACT

An image synthesis method of a virtual object and the apparatus thereof are provided. The image synthesis method of the virtual object comprises providing a first depth image of a scene and a first two-dimensional image of the scene; providing a second depth image of the virtual object; adjusting a second depth value of the virtual object in the first depth image according to an objective location in the first depth image and a reference point of the second depth image; rendering a second two-dimensional image of the virtual object; and synthesizing the first two-dimensional image and the second two-dimensional image according to a lighting direction of the first two-dimensional image, an adjusted second depth value and the objective location in the first depth image.

21 Claims, 6 Drawing Sheets

(51) Int. Cl.
*G06K 9/46* (2006.01)
*G06K 9/62* (2006.01)
*G06T 15/50* (2011.01)
*G06T 15/00* (2011.01)

(52) U.S. Cl.
CPC ............ *G06K 9/6221* (2013.01); *G06T 15/00* (2013.01); *G06T 15/50* (2013.01)

(58) Field of Classification Search
USPC .......................................................... 345/633
See application file for complete search history.

(56) References Cited

U.S. PATENT DOCUMENTS

| | | | |
|---|---|---|---|
| 8,358,304 B2 | 1/2013 | Brabec | |
| 8,884,984 B2 * | 11/2014 | Flaks | ................... G02B 27/017 345/419 |
| 9,280,849 B2 | 3/2016 | Adhikari et al. | |
| 2014/0104316 A1 | 4/2014 | Sharma et al. | |
| 2014/0176535 A1 * | 6/2014 | Krig | ........................ G06T 15/04 345/419 |
| 2014/0192164 A1 * | 7/2014 | Tenn | .................. H04N 13/0242 348/47 |
| 2014/0285523 A1 | 9/2014 | Gruenler et al. | |
| 2014/0313201 A1 | 10/2014 | Shim | |
| 2017/0084001 A1 * | 3/2017 | Holzer | ...................... G06T 3/00 |

FOREIGN PATENT DOCUMENTS

TW         M482797         7/2014
TW         201508547       3/2015

OTHER PUBLICATIONS

Chen et al., "Composition of 3D Graphic Objects and Panorama"; Proceedings of ICAT 2000; pp. 1-8.

Hung et al., "A Purely Image-Based Aproach to Augmenting Panoramas With Object Movies"; Technique Report: TR-IIS-01-011; DMS International Symposium on Computer Graphics and Virtual Reality; (2002), pp. 1-11.

* cited by examiner

IMAGE SYNTHESIS METHOD AND IMAGE SYNTHESIS DEVICE FOR VIRTUAL OBJECT

This application claims the benefit of Taiwan application Serial No. 105136870, filed Nov. 11, 2016, the disclosure of which is incorporated by reference herein in its entirety.

TECHNICAL FIELD

The disclosure relates to an image synthesis method and an image synthesis device for a virtual object.

BACKGROUND

If one virtual object having depth information is needed to be synthesized with an image, the virtual object may be synthesized with a depth image which has depth information and sense of space or may be synthesized with a two-dimensional image. The two-dimensional image is obtained by capturing a real scene by a camera, so the two-dimensional image has good quality, and the edge, the color, the light pattern and shadow pattern of the two-dimensional image are approximate that of the real scene.

However, because the two-dimensional image does not have any depth information, the virtual object synthesized with the two-dimensional image may have wrong sense of distance or cover an object which should be located at the rear of the virtual object.

Therefore, to make sure the virtual object synthesized with the two-dimensional image have correct light pattern, correct shadow pattern, correct sense of distance and correct positional relationship without affecting the image quality is an important issue nowadays.

SUMMARY

According to one embodiment, an image synthesis method for a virtual object is provided. The image synthesis method includes the following steps: A first depth image of a scene and at least one first two-dimensional image of the scene are provided. A second depth image of the virtual object is provided. A second depth value of the virtual object is adjusted according to an object location of the first depth image and a reference point of the second depth image. At least one second two-dimensional image of the virtual object is rendered according to an image lighting direction of the first two-dimensional image, the second depth value which is adjusted and the objection location of the first depth image. The first two-dimensional image and the second two-dimensional image are synthesized.

According to another embodiment, an image synthesis device for a virtual object is provided. The image synthesis device includes a camera, an object providing unit and a processor. The camera is for providing a first depth image of a scene and at least one first two-dimensional image of the scene. The object providing unit is for providing a second depth image of the virtual object. The processor includes a depth adjusting unit, a light source providing unit and a rendering unit. The depth adjusting unit is for adjusting a second depth value of the virtual object according to an object location of the first depth image and a reference point of the second depth image. The light source providing unit is for analyzing an image lighting direction of the first two-dimensional image. The rendering unit is for rendering at least one second two-dimensional image of the virtual object according to the image lighting direction of the first two-dimensional image, the second depth value which is adjusted and the objection location of the first depth image and for synthesizing the first two-dimensional image and the second two-dimensional image.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
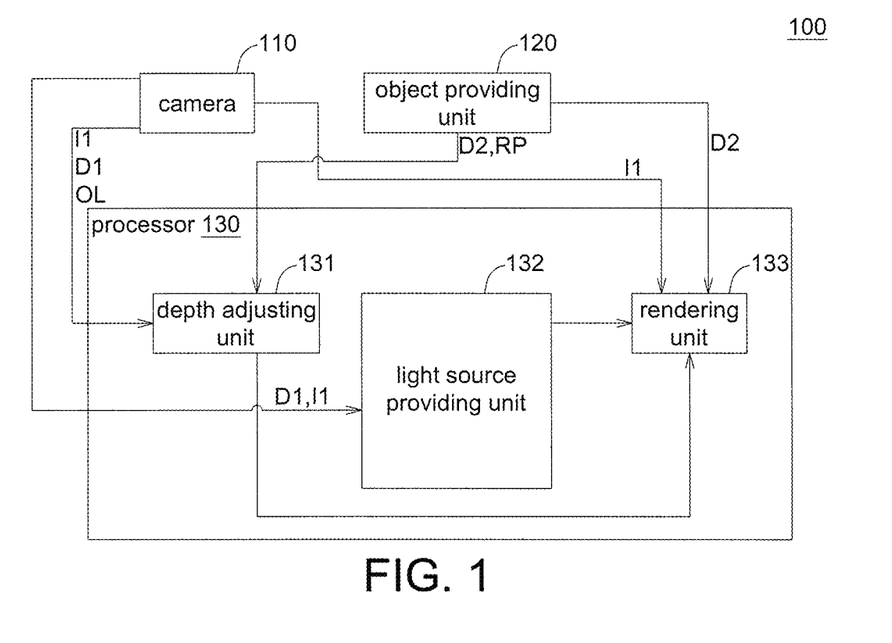
FIG. 1 shows an image synthesis device for a virtual object according to an embodiment of the present disclosure.
Figure 2:
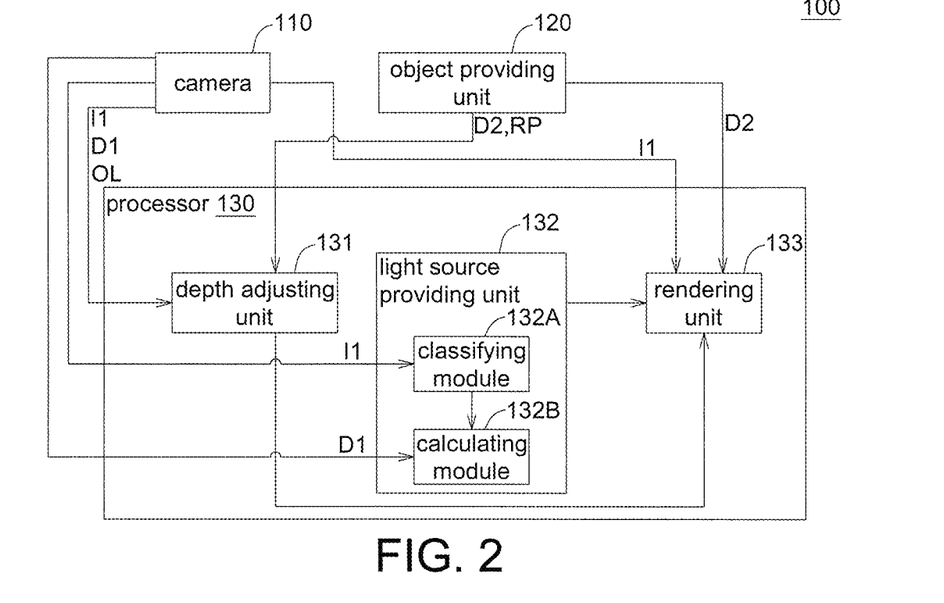
FIG. 2 shows the image synthesis device for the virtual object according to another embodiment of the present disclosure.
Figure 3:
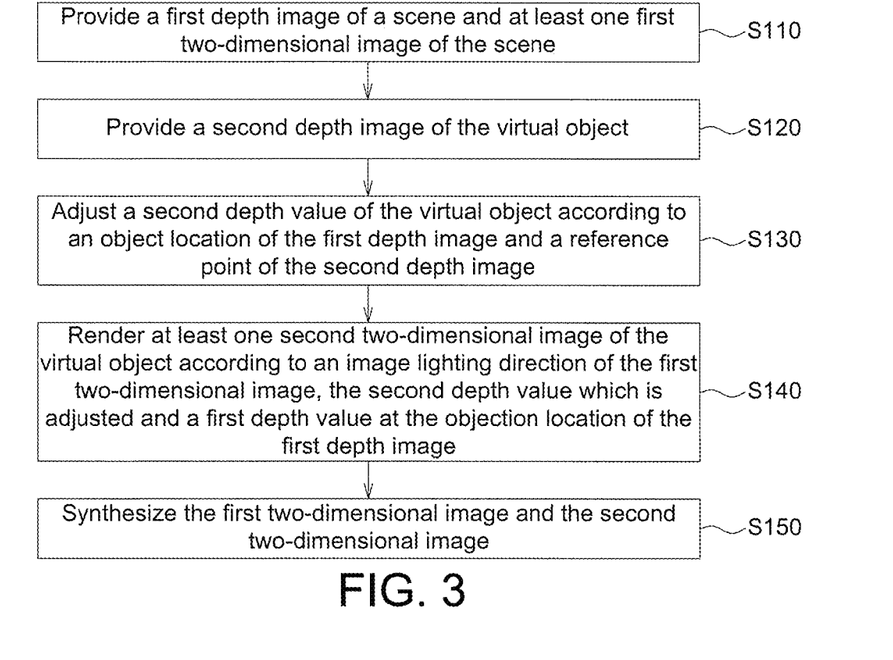
FIG. 3 shows a flowchart of an image synthesis method for the virtual object according to an embodiment of the present disclosure.

FIG. 1 shows an image synthesis device for a virtual object according to an embodiment of the present disclosure. FIG. 2 shows the image synthesis device for the virtual object according to another embodiment of the present disclosure. The difference between FIG. 1 and FIG. 2 is in that a light source providing unit 132 of the FIG. 2 includes a classifying module 132A and a calculating module 132B. FIG. 3 shows a flowchart of an image synthesis method for the virtual object according to an embodiment of the present disclosure. Please refer to FIGS. 2 and 3, the image synthesis device 100 includes a camera 110, an object providing unit 120, and a processor 130. The camera 110 is used for providing a first depth image D1 of a scene and at least one first two-dimensional image I1 of the scene. For example, the camera 110 may be a monochrome camera, or a combination of a color camera and an infrared camera for providing the first two-dimensional image I1 which is a monochrome image, a gray-scale image or a color image and the first depth image D1. The object providing unit 120 is used for providing a second depth image D2 of the virtual object. For example, the object providing unit 120 may be an optical disc or a USB disk. A depth plane can be obtained from a third two-dimensional image of the virtual object and the second depth image D2 is obtained according to the depth plane and the third two-dimensional image.

The processor 130 includes a depth adjusting unit 131, the light source providing unit 132 and a rendering unit 133. The depth adjusting unit 131 is used for adjusting a second depth value of the virtual object according to an object location OL of the first depth image D1 and a reference point RP of the second depth image D2. The light source providing unit 132 is used for analyzing an image lighting direction of the first two-dimensional image I1. The rendering unit 133 is used for rendering at least one second two-dimensional image I2 of the virtual object according to the second depth value which is adjusted, a first depth value of the objection location OL of the first depth image D1 and the image lighting direction, and for synthesizing the first two-dimensional image I1 and the second two-dimensional image I2. The processor 130 is used for performing various procedures, such as depth adjusting procedure, light source providing procedure, and rendering procedure. For example, the processor 130 may be a chip, a circuit, a circuit board, or a storage device storing a plurality of program codes. The object location OL of the first depth image D1 and the reference point RP of the virtual object at the second depth image D2 may be set by the user or may be predetermined in advance.

Figure 4:
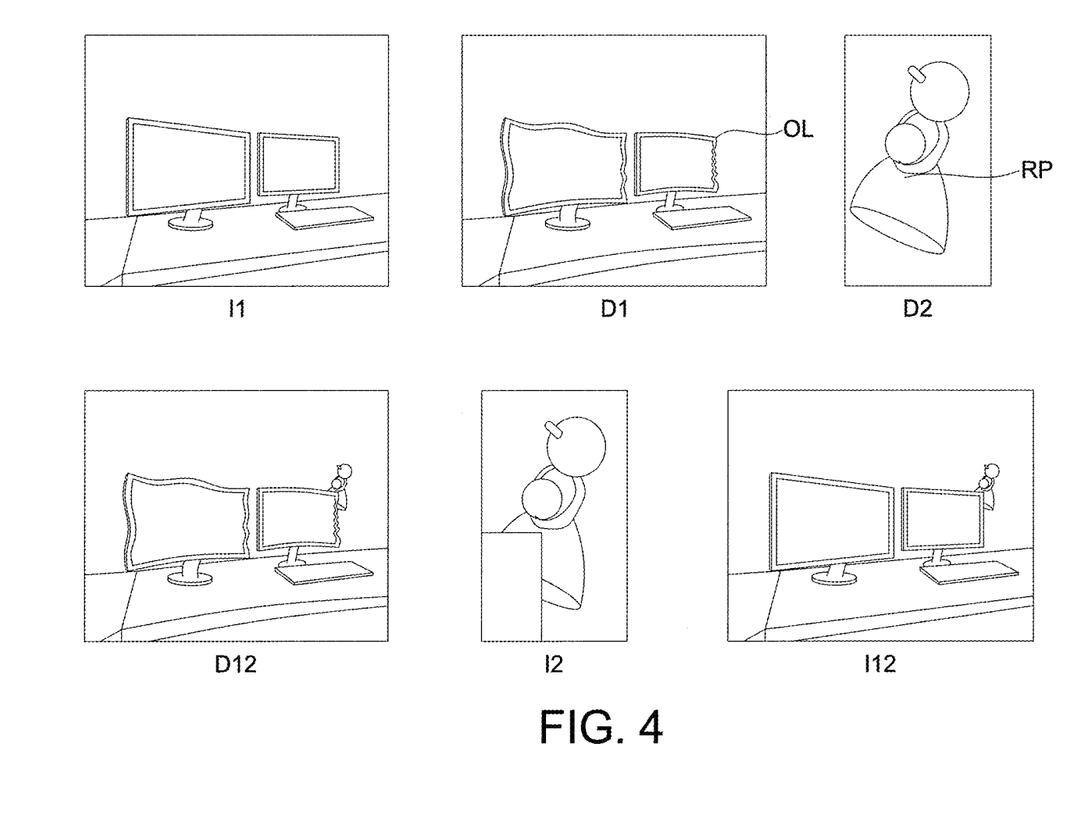
FIG. 4 illustrates a first two-dimensional image, a second two-dimensional image, a first depth image, a second depth image, a synthesized depth image, an object location, a reference point and a synthesized two-dimensional image according to the image synthesis method of FIG. 3.

FIG. 4 illustrates the first two-dimensional image I1, the second two-dimensional image I2, the first depth image D1, the second depth image D2, a synthesized depth image D12, the object location OL, the reference point RP, and a synthesized two-dimensional image I12 according to the image synthesis method of FIG. 3. The first two-dimensional image I1, the second two-dimensional image I2, the first depth image D1, the second depth image D2, the synthesized depth image D12, the object location OL, the reference point RP, and the synthesized two-dimensional image I12 are shown. Please refer to FIGS. 2 to 4, in the step S110, the first depth image D1 of the scene and the first two-dimensional image I1 of the scene are provided. In one embodiment, the coordinate system of the first depth image D1 of the scene and the coordinate system of the first two-dimensional image I1 of the scene correspond with each other. In one embodiment, the first depth image D1 of the scene and the first two-dimensional image I1 of the scene may be provided by the camera 110. According to the relationship between the first depth image D1 and the first two-dimensional image I1, the second two-dimensional image I2 whose view angle is identical to that of the first two-dimensional image I1 can be obtained, when the virtual object is rendered. The number of the at least one first two-dimensional image I1 may be plurality and the number of the at least one second two-dimensional image I2 may be plurality, and in the step rendering the second two-dimensional images I2 of the virtual object, the second two-dimensional images I2 having different view angles are rendered according to a camera parameter corresponding the first two-dimensional images I1 having different view angles.

In the step S120, the second depth image D2 of the virtual object is provided. In the step S130, a second depth value of the virtual object at the first depth image D1 is adjusted according to an object location OL of the first depth image D1 and a reference point RP of the second depth image D2. In one embodiment, please referring FIG. 3, the depth value of the first depth image D1 ranges from 0 to 255, the depth value of the object location OL of the scene (the first depth image D1) is 100; the depth value of the second depth image D2 ranges from 0 to 20, the reference point RP of the virtual object (of the second depth image D2) is 10. When the depth adjusting unit 131 synthesizes the second depth image D2 and the first depth image D1 (for example, the virtual object and the scene are synthesized to be a synthesized depth image D12), the reference point RP of the virtual object (in the second depth image D2) is aligned to the object location OL of the scene (in the first depth image D1). The depth value of the reference point RP of the virtual object (in the second depth image D2) is changed from 10 to 110. As such, the depth value of the virtual object of the scene (in the first depth image D1) is changed and ranges from 100 to 120. After performing this step, the location of the virtual object is confirmed. For example, in the synthesized depth image D12, part of the virtual object is covered by the computer screen.

In the step S120 of providing the second depth image D2 of the virtual object, a plurality of fourth two-dimensional images having different view angles are further provided. In the step of rending the second two-dimensional image I2, one of the fourth two-dimensional images having a particular view angle is selected to be rendered. If the fourth two-dimensional image having the particular view angle is not existed, then the fourth two-dimensional image has the particular view angle may be obtained by interpolation.

In the step S140, the second two-dimensional image I2 of the virtual object is rendered according to the image lighting direction of the first two-dimensional image I1, the second depth value which is adjusted and the first depth value at the objection location. The depth value of the virtual object is updated to be 110 in the forgoing embodiment. The depth value of the object location OL of the scene (in the first depth image D1) is updated to be 100 in the forgoing embodiment. The lighting direction of the first two-dimensional image I1 is illustrated in FIG. 5.

In the step S150, the first two-dimensional image I1 and the second two-dimensional image I2 are synthesized to be the synthesized two-dimensional image I12. If part of the virtual object is hidden by one object of the first two-dimensional image I1, such as the computer screen of the synthesized depth image D12 in the FIG. 4, the portion of the virtual object which is hidden, such as the lower left part of the second two-dimensional image I2 of the FIG. 4, is hollowed out, when the second two-dimensional image I2 of the virtual object is rendered.

Figure 5:
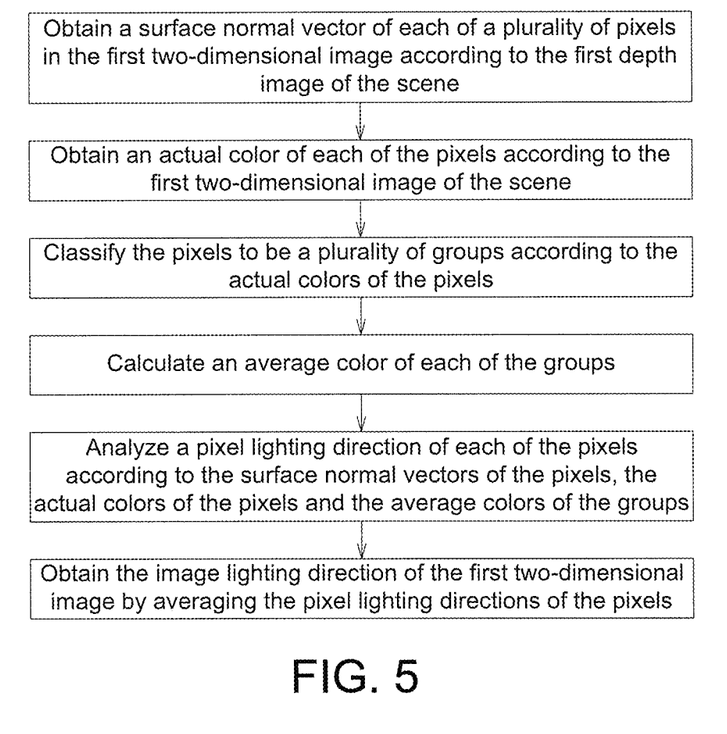
FIG. 5 shows a flowchart of an analyzing method of the image lighting direction of the first two-dimensional image according to an embodiment of the present disclosure.

FIG. 5 shows a flowchart of an analyzing method of the image lighting direction of the first two-dimensional image I1 according to an embodiment of the present disclosure. Please refer to FIGS. 2 to 5. The light source providing unit 132 of the processor 130 is used for analyzing the image lighting direction of the first two-dimensional image I1. The light source providing unit 132 includes the classifying module 132A and the calculating module 132B. The image lighting direction of the first two-dimensional image I1 can be obtained by a Lambertian reflectance model, illustrated as the following equation (1):

$$I = \rho \lambda (N \cdot L) \quad (1)$$

During analyzing the image lighting direction of the first two-dimensional image I1 according to the equation (1), one pixel is a unit of measurement. I is the intensity of the actual color of the pixel, which may be provided by the camera 110. N is the surface normal vector of the pixel, $\rho$ is the albedo of the surface, $\lambda$ is the intensity of the illuminant, and $\rho\lambda$ is the average color of the actual color of one group. L is a pixel lighting direction. During calculating the image lighting direction of the first two-dimensional image I1, the location of the light source is fixed, and the equation (1) can be differentiated to I to obtain the following equation (2):

$$dI = d(\rho \lambda (N \cdot L)) \quad (2)$$

Thus, the changes of the color can be calculated based on the surface normal vector. In the equation (2), only L in unknown, so the pixel lighting direction can be obtained.

Further, during calculating the image lighting direction of the first two-dimensional image I1, the classifying module 132A classifies the pixels of the first two-dimensional image I1 to be a plurality of groups according to the actual colors of the pixels of the first two-dimensional image I1. The calculating module 132B obtains the surface normal vector (N) of each of the pixels in the first two-dimensional image I1 according to the first depth image D1 of the scene. In one embodiment, during calculating the surface normal vector (N), the first depth image D1 can be transformed to be a 3D triangular mesh, and then the surface normal vector (N) of each pixel can be calculated according to the 3D triangular mesh. The calculating module 132B calculates the average color ($\rho\lambda$) of each of the groups. The calculating module 132B is further analyzes the pixel lighting direction (L) of each of the pixels according to the surface normal vector (N) of each of the pixels, the actual color (i) of each of the pixels and the average color ($\rho\lambda$) of each of the groups, and obtains the image lighting direction of the first two-dimensional image I1 by averaging the pixel lighting directions of the pixels.

Figure 6:
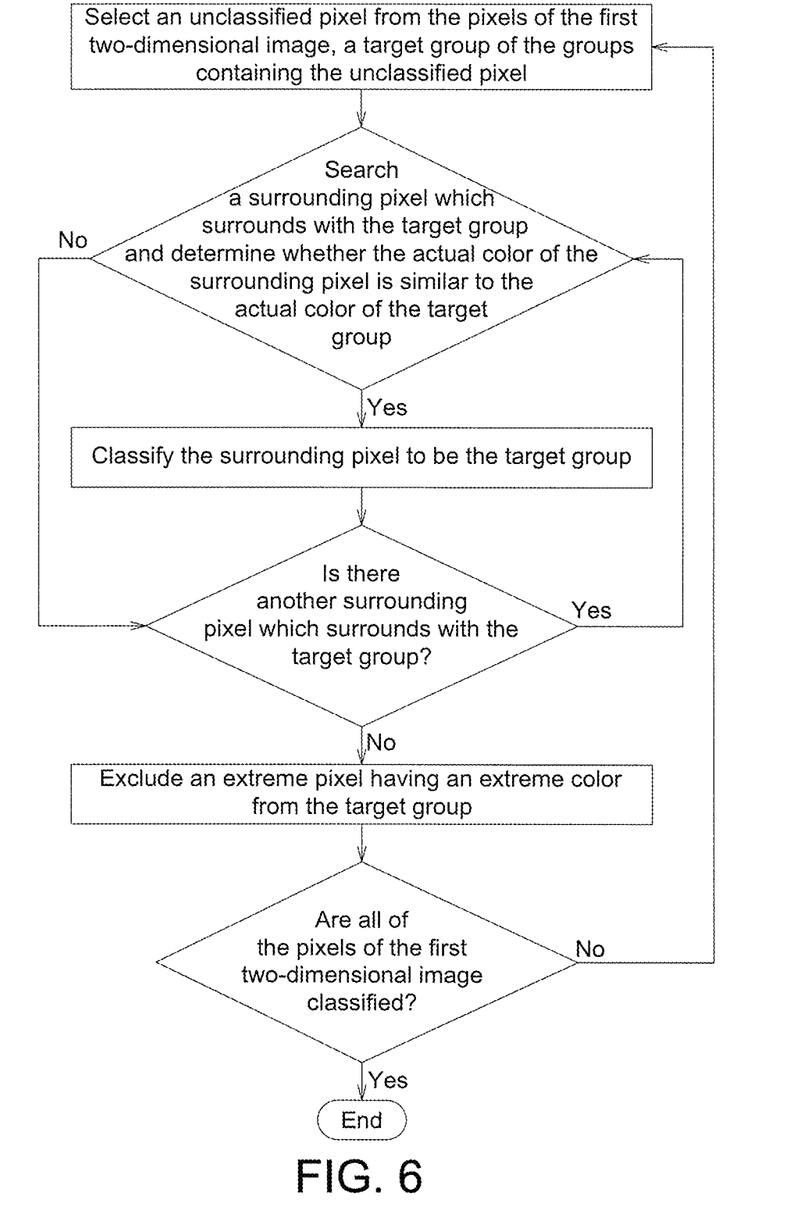
FIG. 6 shows a flowchart of the step of classifying the pixels of the first two-dimensional image to be the groups.
Figure 7:
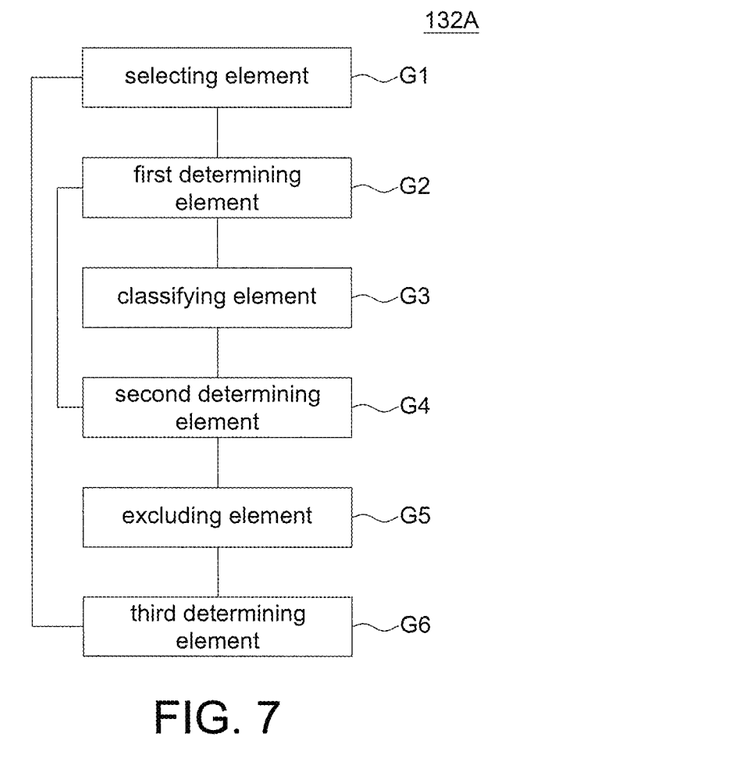
FIG. 7 shows a classifying module according to one embodiment of the present disclosure.

FIG. 6 shows a flowchart of the step of classifying the pixels of the first two-dimensional image to be the groups. FIG. 7 shows the classifying module according to one embodiment of the present disclosure. Please refer to FIGS. 1 to 7. The classifying module 132A includes a selecting element G1, a first determining element G2, a classifying element G3, a second determining element G4, an excluding element G5 and a third determining element G6. The classifying module 132A is used for performing the following steps. In one embodiment, the selecting element G1 selects an unclassified pixel from the pixels of the first two-dimensional image I1. A target group of the groups contains the unclassified pixel. The first determining element G2 searches a surrounding pixel which surrounds with the target group and determines whether the actual color of the surrounding pixel is similar to the actual color of the target group. For example, the first determining element G2 searches 8 surrounding pixels which surround the unclassified pixel. The unclassified pixel and the 8 surrounding pixels form a 3*3 square. If the actual color of one of the surrounding pixels is similar to the actual color of the target group, the classifying element G3 classifies this surrounding pixel to be the target group. The second determining element G4 determines whether there is another surrounding pixel which surrounds with the target group. If there is no surrounding pixel, the excluding element G5 excludes an extreme pixel having an extreme color from the target group; if there is another surrounding pixel, the first determining element G2 searches another surrounding pixel which surrounds with the target group again and determines whether the actual color of the surrounding pixel is similar to the actual color of the target group. For example, if the target group is a 2*3 matrix, then the first determining element G2 search 14 surrounding pixels which surround the target group. The target group and the surrounding pixels form a 4*5 matrix. If the first determining element G2 concludes that the actual color of the surrounding pixel is not similar to the actual color of the target group, then the second determining element G4 determines whether there is another surrounding pixel. The third determining element G6 determines whether all of the pixels of the first two-dimensional image I1 are classified. If all of the pixels of the first two-dimensional image I1 are classified, then the step of classifying one the pixels to be one of the groups is terminated; if one of the pixels of the first two-dimensional image is not classified, then the selecting element G1 selects another unclassified pixel of the first two-dimensional image I1 again.

Further, the step of excluding the extreme pixel is illustrated as following. For each of the groups, a statistic analysis of the actual color is performed. In one embodiment, the actual color of each pixel of the first two-dimensional image I1 of the scene includes three primary colors, such as red color, blue color and green color. The intensity distribution of the red color, the blue color, the green color of the pixels is drawn and the standard deviation of each of the three primary colors is calculated. Whether the red color of one of the pixels is larger than a predetermined red value, the blue color of one of the pixels is larger than a predetermined blue color, or the green color of one of the pixel is larger than a predetermined green value is determined. For example, in the intensity distribution of the red color, a red color standard deviation is obtained. In one embodiment, if one pixel has a color which is larger than 2 times the standard deviation, then this pixel has an extreme color and this pixel can be excluded from the group. The three primary colors of one pixel may have different values. In one embodiment, if any one of the red color, the blue color and the green color of one pixel are larger than 2 times the blue color standard deviation and the green color standard deviation respectively, then this pixel is excluded from the group. In one embodiment, the predetermined red value is N times a red color standard deviation in one of the groups, the predetermined blue value is N times a blue color standard deviation in one of the groups, the predetermined green value is N times a green color standard deviation in one of the groups, and N is rational number and larger than zero. In another embodiment, one of the pixel having more than two colors which are larger than 2 times the standard deviations respectively is excluded. The excluded pixel is needed to be classified again.

In practical applications, the image synthesis method for the virtual object of the present disclosure can be used in medical operation, Augmented Reality (AR) games, display of new building or furniture display in interior design.

In the image synthesis method and the image synthesis device for the virtual object of the present disclosure, the virtual object is synthesized with the first two-dimensional image. The virtual object is rendered according to the light distribution of the first two-dimensional image, the shading and the space sense, such that the dimensional sense of the virtual object synthesized with the scene can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image synthesis method for a virtual object, comprising:
providing a first depth image of a scene and at least one first two-dimensional image of the scene;
providing a second depth image of the virtual object;
adjusting a second depth value of the virtual object according to an object location of the first depth image and a reference point of the second depth image;
obtaining an image lighting direction of the first two-dimensional image of the scene, wherein the image lighting direction of the first two-dimensional image of the scene is obtained at least according to a plurality of surface normal vectors of a plurality of pixels in the first two-dimensional image of the scene, and each of the surface normal vectors is obtained according to the first depth image of the scene;

rendering at least one second two-dimensional image of the virtual object according to the image lighting direction of the first two-dimensional image of the scene, the second depth value which is adjusted and a first depth value at the objection location of the first depth image; and synthesizing the first two-dimensional image of the scene and the second two-dimensional image of the virtual object, wherein the image synthesis method further comprises obtaining the image lighting direction of the first two-dimensional image of the scene, and the step of obtaining the image lighting direction of the first two-dimensional image of the scene comprises:

classifying the pixels to be a plurality of groups according to an actual colors of each of the pixels;

wherein the step of classifying one of the pixels to be one of the groups comprises:

selecting an unclassified pixel from the pixels of the first two-dimensional image of the scene, wherein a target group of the groups contains the unclassified pixel;

searching a surrounding pixel which surrounds with the target group and determining whether the actual color of the surrounding pixel is similar to the actual color of the target group;

classifying the surrounding pixel to be the target group, if the actual color of the surrounding pixel is similar to the actual color of the target group;

determining whether there is another surrounding pixel which surrounds with the target group;

excluding an extreme pixel having an extreme color from the target group, if there is no surrounding pixel; and determining whether all of the pixels of the first two-dimensional image of the scene are classified, wherein if all of the pixels of the first two-dimensional image of the scene are classified, then the step of classifying one of the pixels to be one of the groups is terminated.

2. The image synthesis method according to claim 1, wherein the step of rendering the second two-dimensional image of the virtual object comprises:

hollowing out a portion of the virtual object which is hidden from one object of the first two-dimensional image of the scene, when the second two-dimensional image of the virtual object is rendered.

3. The image synthesis method according to claim 1, wherein a number of the at least one first two-dimensional image of the scene is plurality, and the first two-dimensional images of the scene have different view angles.

4. The image synthesis method according to claim 3, wherein in the step of rendering the at least one second two-dimensional image of the virtual object, a number of the at least one second two-dimensional image of the virtual object is plurality, and the second two-dimensional images of the virtual object having different view angles are rendered according to a camera parameter.

5. The image synthesis method according to claim 1, wherein in the step of providing the second depth image of the virtual object, a plurality of fourth two-dimensional images of the virtual object having different view angles are provided, and in the step of rendering the at least one second two-dimensional image of the virtual object, one of the fourth two-dimensional images of the virtual object having a particular view angle is selected to be rendered.

6. The image synthesis method according to claim 5, wherein the one of the fourth two-dimensional images of the virtual object has the particular view angle is obtained by interpolation.

7. The image synthesis method according to claim 1, wherein the step of obtaining the image lighting direction of the first two-dimensional image of the scene further comprises:

obtaining the surface normal vector of each of the pixels in the first two-dimensional image of the scene according to the first depth image of the scene;

obtaining the actual color of each of the pixels according to the first two-dimensional image of the scene;

calculating an average color of each of the groups;

analyzing a pixel lighting direction of each of the pixels according to the surface normal vectors of the pixels, the actual colors of the pixels and the average colors of the groups; and obtaining the image lighting direction of the first two-dimensional image of the scene by averaging the pixel lighting directions of the pixels.

8. The image synthesis method according to claim 7, wherein after the step of determining whether the actual color of the surrounding pixel is similar to the actual color of the target group is performed, if the actual color of the surrounding pixel is not similar to the actual color of the target group, then the step of determining whether there is another surrounding pixel is performed.

9. The image synthesis method according to claim 8, wherein after the step of determining whether there is another surrounding pixel is performed, if there is another surrounding pixel, then the step of searching the surrounding pixel and determining whether the actual color of the surrounding pixel is similar to the actual color of the target group is performed.

10. The image synthesis method according to claim 8, wherein after the step of determining whether all of the pixels of the first two-dimensional image of the scene are classified is performed, if at least one of the pixels of the first two-dimensional image of the scene is not classified, then the step of selecting the unclassified pixel is performed.

11. The image synthesis method according to claim 8, wherein in the step of excluding the extreme pixel, a red color of the extreme pixel is larger than a predetermined red value, a blue color of the extreme pixel is larger than a predetermined blue color, or a green color of the extreme pixel is larger than a predetermined green value.

12. The image synthesis method according to claim 11, wherein the predetermined red value is N times a red color standard deviation in one of the groups, the predetermined blue value is N times a blue color standard deviation in one of the groups, the predetermined green value is N times a green color standard deviation in one of the groups, and N is rational number and larger than zero.

13. The image synthesis method according to claim 1, wherein a coordinate system of the first depth image of the scene and a coordinate system of the first two-dimensional image of the scene correspond with each other.

14. An image synthesis device for a virtual object, comprising:

a camera for providing a first depth image of a scene and at least one first two-dimensional image of the scene;

an object providing unit for providing a second depth image of the virtual object; and a processor, including:

a depth adjusting unit for adjusting a second depth value of the virtual object according to an object location of the first depth image and a reference point of the second depth image;

a light source providing unit for analyzing an image lighting direction of the first two-dimensional image of the scene, wherein the image lighting direction of the first two-dimensional image of the scene is obtained at least according to a plurality of surface normal vectors of a plurality of pixels in the first two-dimensional image of the scene, and each of the surface normal vectors is obtained according to the first depth image of the scene; and a rendering unit for rendering at least one second two-dimensional image of the virtual object according to the image lighting direction of the first two-dimensional image of the scene, the second depth value which is adjusted and a first depth value at the objection location of the first depth image and for synthesizing the first two-dimensional image of the scene and the second two-dimensional image of the virtual object, wherein the light source providing unit comprises:

a classifying module for classifying the pixels of the first tow-dimensional image to be a plurality of groups according to a plurality of actual colors of the pixels;

wherein the classifying module includes:

a selecting element for selecting an unclassified pixel from the pixels of the first two-dimensional image of the scene, wherein a target group of the groups contains the unclassified pixel;

a first determining element for searching a surrounding pixel which surrounds with the target group and for determining whether the actual color of the surrounding pixel is similar to the actual color of the target group;

a classifying element for classifying the surrounding pixel to be the target group, if the actual color of the surrounding pixel is similar to the actual color of the target group;

a second determining element for determining whether there is another surrounding pixel which surrounds with the target group;

an excluding element for excluding an extreme pixel having an extreme color from the target group, if there is no surrounding pixel; and a third determining element for determining whether all of the pixels of the first two-dimensional image of the scene are classified, wherein if all of the pixels of the first two-dimensional image of the scene are classified, then the classifying module stops classifying.

15. The image synthesis device according to claim 14, wherein when the rendering unit renders the second two-dimensional image of the virtual object, a portion of the virtual object which is hidden is hollowed out from one object of the first two-dimensional image of the scene.

16. The image synthesis device according to claim 14, wherein the light source providing unit further comprises:

a calculating module for obtaining the surface normal vector of each of the pixels in the first two-dimensional image of the scene according to the first depth image of the scene, for calculating an average color of each of the groups, for analyzing a pixel lighting direction of each of the pixels, and for obtaining the image lighting direction of the first two-dimensional image of the scene by averaging the pixel lighting directions of the pixels.

17. The image synthesis device according to claim 16, wherein if the first determining element concludes that the actual color of the surrounding pixel is not similar to the actual color of the target group, then the second determining element starts to determine whether there is another surrounding pixel.

18. The image synthesis device according to claim 16, wherein if the second determining element concludes that there is another surrounding pixel, then the first determining element searches the surrounding pixel again and determines whether the actual color of the surrounding pixel is similar to the actual color of the target group again.

19. The image synthesis device according to claim 16, wherein if the third determining element concludes that at least one of the pixels of the first two-dimensional image of the scene is not classified, then the selecting element selects the unclassified pixel again.

20. The image synthesis device according to claim 16, wherein a red color of the extreme pixel is larger than a predetermined red value, a blue color of the extreme pixel is larger than a predetermined blue color, or a green color of the extreme pixel is larger than a predetermined green value.

21. The image synthesis device according to claim 20, wherein the predetermined red value is N times a red color standard deviation in one of the groups, the predetermined blue value is N times a blue color standard deviation in one of the groups, the predetermined green value is N times a green color standard deviation in one of the groups, and N is rational number and larger than zero.

* * * * *